United States Patent Office 3,432,566
Patented Mar. 11, 1969

3,432,566
CAROTENOID COMPOUNDS
Albert J. Chechak and Charles D. Robeson, Rochester, N.Y., assignors to Eastman Kodak Company, Rochester, N.Y., a corporation of New Jersey
No Drawing. Filed Mar. 23, 1966, Ser. No. 536,654
U.S. Cl. 260—668                                    1 Claim
Int. Cl. 15/04

ABSTRACT OF THE DISCLOSURE

As a new composition of matter, the compound 1-(2,6,6 - trimethylcyclohex - 1 - enyl) - 14 - phenyl - 3,7,10-trimethyltetradec - 1,3,5,7,9,11,13 - heptaene. This compound is useful as a food colorant and as a skin and egg yolk pigmenting additive for poultry feed.

This invention resides in the chemical arts. More particularly it relates to that part of organic chemistry having to do with carotenoid compounds.

Carotenoid compounds are organic compounds of aliphatic molecular structure and of aliphatic-alicylic molecular structure which structures contain partly dehydrogenated isoprene groups (from 3 or 4 to 8 or more). These groups are present in a chain in such a way that the alternate single and double bonds (conjugated double bonds) form a chromophoric system.

In the feeding of poultry, particularly chickens, there is a need for materials which, when ingested by poultry, cause the skin and fat to acquire a yellow tint that is desired by certain ethnic groups, and produce a coloration in the yolks of eggs laid by such poultry, which coloration is desired by manufacturers of cake mixes, egg noodles and the like. Many commercial poultry feeds such as, for example, those based on milo as a substitute for corn, while otherwise quite adequate for poultry nutrition, are deficient in such materials.

A number of naturally occurring and known synthetic carotenoid compounds are poultry colorants or pigmenters. Representative of these compounds are lutein, zeaxanthin, canthaxanthin, physalien, helenien and $\beta$-apo-carotenoic acid methyl ester.

On the other hand a number of known carotenoid compounds are not deposited in poultry skin and fat and in poultry eggs to any appreciable extent. Representative of these compounds are the carotenes such as $\beta$-carotene, $\epsilon$-carotene, bis-dehydro-$\beta$-carotene, and the like.

An object of this invention is to provide new carotenoid compounds which are poultry colorants or pigments.

There is also a need for edible food colorants suitable for coloring margarine, butter, cheese, fruit juice, soft drinks, candy and other foods.

Another object of this invention is to provide new carotenoid compounds which are useful as food colorants.

These and other objects as may appear hereinafter are achieved by this invention.

In summary, this invention comprises a new carotenoid compound. It is 1-(2,6,6-trimethylcyclohex-1-enyl)-14-phenyl - 3,7,10 - trimethyltetradec - 1,3,7,9,11,13 - heptaene. This compound is a solid at 20–25° C. It has a typical light absorption value of $\lambda$max=437 with an extinction coefficient E(1%, 1 cm., chloroform)(436 mu)=2700. When added to chicken feed otherwise free of skin and egg yolk pigmenters it causes the skin and fat of chickens ingesting the feed to have a yellowish tint and the egg yolks to become yellow. It is also useful as a food colorant in foods for human consumption.

The compound of this invention is made from readily available materials. A working example of a specific embodiment of a process for synthesizing it is as follows:

20 grams of cinnamaldehyde are dissolved in 100 milliliters of acetone. 100 milliliters of methanol are added to the resulting solution. The solution thus obtained is cooled to −20° C., 120 milliliters of 10% methanolic potassium hydroxide solution are admixed therewith, and the resulting mixture is kept at this temperature for 18 hours. The mixture is then filtered. 300 milliliters of diethyl ether and 300 milliliters of water are admixed with the filtrate and the resulting ethereal phase separated. The diethyl ether is removed by evaporation, leaving cinnamal acetone, a typical quantity being 15.7 grams.

5 grams of the cinnamal acetone is dissolved in 60 milliliters of anhydrous ether, the solution cooled to −20° C. and then 50 milliliters of an 0.8 molar ethereal solution of lithium aluminum hydride are admixed therewith added dropwise to it. Subsequently, acetone is added in order to destroy any excess lithium aluminum hydride and the ether solution is washed with dilute hydrochloric acid, sodium bicarbonate and water. The washed ether solution is then dried over sodium sulfate, and the diethyl ether evaporated to give a product consisting essentially of 6-phenyl-penta-3,5-dien-2-ol. A typical quantity of the product obtained under these conditions is 4.5 grams and a typical light absorption value is E(1%, 1 cm., ethanol) (288 mu)=1150.

4.5 grams of the product consisting essentially of 6-phenylpenta-3,5-dien-2-ol are dissolved in 20 milliliters of methanol. 7.4 grams of triphenylphosphine are admixed at 20–25° C. under nitrogen with the methanolic solution followed by 35 milliliters of 1.65 Normal methanolic hydrogen chloride. The resulting solution is stirred for 3 hours at 20° C. and then cooled to 0° C. 31 milliliters of 2 Normal methanolic potassium hydroxide are added to the solution. Then, 5 grams of retinal are admixed with the solution. The resulting mixture is stirred for ½ hour at 0° C. and then allowed to stand at 5° C. overnight. The solids which have formed in the mixture are collected by filtration, washed successively with methanol, water and methanol, and then dried under vacuum over calcium chloride. The dried solids are then recrystallized from chloroform and methanol to give the desired product. It consists essentially of 1-(2,6,6-trimethylcyclohex-1-enyl) - 14 - phenyl - 3,7,10 - trimethyl - tetradec - 1,3,5,7,9,11,13-heptaene. A typical quantity of product obtained under these conditions is 0.48 gram. A typical light absorption value of the product is E(1%, 1 cm., chloroform) (436 mu)=2700.

A sample of product made according to the foregoing procedure was actually fed to 3 week old Hallcross White Leghorn cockerels for seven days at a level of 18 milligrams per pound of feed, these birds having been kept on a pigment-low diet from birth and being depleted of skin pigments at the time the carotenoid compound of this invention was introduced into the diet. At the end of the seven days the shank skin pigmentation was assessed visually by a panel of four people which found deposition of the compound in the shank skin and that the color was yellow with a slight greenish cast.

A sample of the product made according to the foregoing procedure was also actually fed to Hallcross White Leghorn laying hens sustained on the same pigment-low diet as the cockerels. The product was administered in corn oil at a level of 12 milligrams per day and was introduced into the birds by capsule feeding. After approximately one week of feeding the egg yolks were examined and were found to have a yellowish color which did not exist in the egg yolks prior to feeding of the product to the hens.

Thus, this invention provides a carotenoid compound which causes pigmentation to develop in poultry egg yolks.

Other features and advantages of this invention will be readily apparent to those in the exercise of ordinary skill in the art after reading the foregoing disclosures. In this regard, while a specific embodiment of a process for synthesizing the compound of this invention has been described in considerable detail, variations and modifications of this process can be effected without departing from the spirit and scope of the invention as disclosed and claimed.

We claim:

1. 1-(2,6,6-trimethylcyclohex-1-enyl)-14-phenyl-3,7,10-trimethyltetradec-1,3,5,7,9,11,13-heptaene.

References Cited

UNITED STATES PATENTS

| 3,125,571 | 3/1964 | Chechak et al. | 260—666 XR |
| 3,184,516 | 5/1965 | Chechak et al. | 260—666 |

DELBERT E. GANTZ, *Primary Examiner.*

C. R. DAVIS, *Assistant Examiner.*

U.S. Cl. X.R.

99—2; 260—666